May 13, 1952     S. M. MERCIER     2,596,499
MULTIRUBBER TIRED CONVEYER IDLER
Filed April 8, 1947
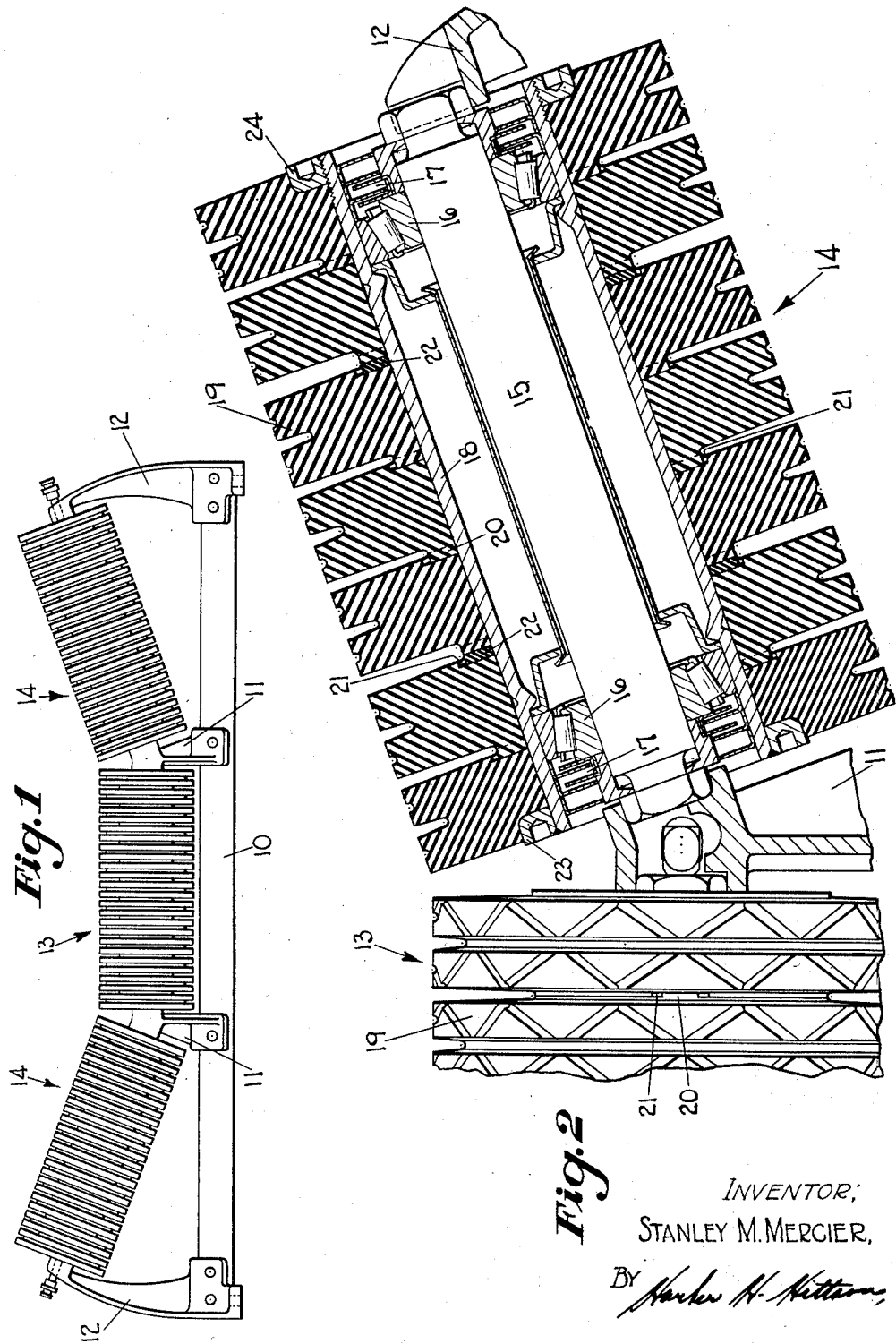
INVENTOR;
STANLEY M. MERCIER,
ATTY.

Patented May 13, 1952

2,596,499

UNITED STATES PATENT OFFICE 2,596,499

MULTIRUBBER TIRED CONVEYER IDLER

Stanley M. Mercier, Bexley, Ohio, assignor to The Jeffrey Manufacturing Company, a corporation of Ohio Application April 8, 1947, Serial No. 740,013

10 Claims. (Cl. 74—230.7)

This invention relates to a conveyer idler, and an object of the invention is to provide an improved conveyer idler roll having a plurality of separate rubber tires mounted on a metal tubular hub or shell and interlocked to insure against their relative rotation on said shell.

Another object of the invention is to provide an idler roll for a conveyer idler, in which separate tires, preferably but not necessarily of rubber, are mounted on a shell and are interlocked, while means, preferably in the form of flexible rings of rubber or the like, are interposed between two or more tires so that standard size tires may be mounted to form rolls of different axial lengths.

Other objects of the invention will appear hereinafter, the novel features and combinations being set forth in the appended claims.

In the accompanying drawings,

Fig. 1 is an elevational view of an idler incorporating the features of my invention; and Fig. 2 is an enlarged view, showing one of the idler rolls in section.

In Fig. 1 of the drawings a troughing idler is shown which includes a base 10 carrying a pair of roller stands or brackets 11 and a pair of end roller stands or brackets 12, all being of standard construction. The brackets 11 support a central roll 13 of the troughing idler which is formed by it and the two inclined outer rolls 14.

The invention here involved is directed particularly to the structure of the idler rolls 13 and 14 which are of similar construction. Each said roll 13 and 14 includes a supporting shaft 15 provided with spaced anti-friction bearings 16 and grease seals 17. The outer race of the bearings 16 preferably has a close fit with the internal surface of a roll hub 18 in the form of a cylindrical shell or tube.

Mounted on the shell or tube 18 is a plurality of adjacent or stacked tires 19, preferably made of rubber or similar flexible material, since the principal function of the idler is to withstand shocks due to dumping of large particles of granular material, such as stone, coal, or the like, onto a conveyer belt in a manner well understood in the conveyer art.

Except for the end tires 19, they are all of substantially the same construction which has a number of advantages. First of all, rolls of different length or axial dimension may be built up by the simple expedient of varying the number of tires in the roll. Furthermore, if one or more tires become unduly worn it is possible to interchange the tires or to replace those which are badly worn.

Each of the interior tires is provided with a base or hub section which constitutes an extension of the hub provided by the metal tube or shell 18, and these hub sections of the tires are provided with interlocking means, preferably in the form of projections 20 on one side and recesses 21 on the opposite side. There may be one or more projections and recesses around the circumference of the tire hubs, thus providing plural interlocking means between each adjacent tire. This interlocking of the tires is desirable so as to prevent any tire from slipping on the tube or from rotating with respect to another tire and thus becoming loose.

In some instances, where rolls of different lengths are formed, it happens that the dimensions of the individual tires are such that it is necessary to provide one or more spacers or fillers between successive or adjacent tires, in order that the overall length or axial dimension of the roll has the desired value. To this end, one or more spacers 22 may be provided between two successive tires 19, preferably adjacent the hub portions thereof. These spacers 22 are preferably in the form of rubber rings or other flexible material so that they may be deflected or deformed by the projections 20 and thus extend into the recesses 21, thereby cooperating with said projections and recesses 20 and 21 to maintain the locking relation between said successive or adjacent tires 19.

If desired, the rings 22 may be provided with permanent projections and recesses, similar to those on the tire hubs, to effectuate the interlocking relation between successive or adjacent tires, but where soft rubber is employed the deformation of said rings 22, incident to clamping the individual tires 19 on the shell 18, will be adequate to maintain this interlocking relation.

The stacked or group of individual tires 19 are preferably axially clamped together on the shell 18 between a fixed end ring 23, adjacent one end, which is preferably permanently welded to the shell 18, and an adjustable end ring 24, at the opposite end, which is preferably screw-threaded to the tube or shell 18.

It is thus evident that by stacking a plurality of tires 19, either with or without the spacer rings 22, as the situation requires, they may be compressed between the end rings 23 and 24, particularly by adjusting the latter with respect to the shell 18. The outer tires 19 are preferably provided with circumferential grooves adjacent their hubs, into which the end rings 23 and 24 extend.

From the above description it is evident that each individual roll of the conveyer idler is built up particularly of a plurality of separable rubber tires which are of similar construction, except for the end ones, and that the tires are readily removable or interchangeable to take care of wear, the number of tires may be adjusted to provide rollers of different overall length, and the individual tires are interlocked against relative rotation and thus are held against rotation with respect to the shell 18. In addition, by interposing one or more spacer rings 22, when required, a roller of any desired or required length along its tread may be provided while maintaining the interlocked relation between all of said individual tires.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A conveyer idler including a tubular hub shell, a plurality of separate rubber tires stacked on said shell, means providing interlocking projection and recess means on said tires, and spacer ring means interposed between adjacent tires constructed to cooperate with said interlocking means to effectuate an interlock between successive tires through said ring.

2. A conveyer idler including a tubular hub shell, a plurality of separate tires stacked on said shell, means providing interlocking projection and recess means on said tires, and spacer ring means interposed between adjacent tires constructed to cooperate with said interlocking means to effectuate an interlock between successive tires through said ring.

3. A conveyer idler roll including a tubular hub shell and a plurality of separate rubber tires stacked on said shell, each one of at least two of said tires being provided with a base section forming an extension of said shell, a flexible ring interposed between the bases of successive tires, and cooperating interlocking means for interlocking said successive tires together through said ring in the form of a projection on one side of a tire and a recess on the opposite side of the tire.

4. A conveyer idler roll including a tubular hub shell and a plurality of separate tires stacked on said shell, each one of at least two of said tires being provided with a base section forming an extension of said shell, a flexible ring interposed between the bases of successive tires, and cooperating interlocking means for interlocking said successive tires together through said ring in the form of a projection on one side of a tire and a recess on the opposite side of the tire.

5. A conveyer idler roll including a tubular hub shell and a plurality of separate tires stacked on said shell, each one of at least two of said tires being provided with a base section forming an extension of said shell, a ring interposed between the bases of successive tires, and cooperating interlocking means for interlocking said successive tires together through said ring in the form of a projection on one side of a tire and a recess on the opposite side of the tire.

6. A conveyer idler roll including a tubular hub shell and a plurality of separate rubber tires stacked on said shell, each one of at least two of said tires being provided with a base section forming an extension of said shell, a ring interposed between the bases of successive tires, and cooperating interlocking means for interlocking said successive tires together through said ring in the form of a projection on one side of a tire and a recess on the opposite side of the tire.

7. A conveyer roll including a hub, at least two spaced adjacent tires stacked on said hub, one of said tires including a base section projecting laterally therefrom toward the adjacent tire for spacing said tires, said base section being provided with interlocking means in the form of a laterally extending projection on one of said tires, the adjacent tire including a recess adapted to receive said laterally extending projection for interlocking said adjacent tires, and means clamping said tires together on said hub.

8. A conveyer roll including a tubular hub, at least two spaced adjacent tires stacked on said hub, one of said tires including a base section projecting laterally therefrom toward the adjacent tire for spacing said tires, said base section being provided with interlocking means in the form of a laterally extending projection on one of said tires, the adjacent tire including a recess adapted to receive said laterally extending projection for interlocking said adjacent tires, and means clamping said tires together on said hub.

9. A conveyer roll including a hub, at least two spaced adjacent rubber tires stacked on said hub, one of said tires including a base section projecting laterally therefrom toward the adjacent tire for spacing said tires, said base section being provided with interlocking means in the form of a laterally extending projection on one of said tires, the adjacent tire including a recess adapted to receive said laterally extending projection for interlocking said adjacent tires, and means clamping said tires together on said hub.

10. A conveyer roll including a tubular hub, at least two spaced adjacent rubber tires stacked on said hub, one of said tires including a base section projecting laterally therefrom toward the adjacent tire for spacing said tires, said base section being provided with interlocking means in the form of a laterally extending projection on one of said tires, the adjacent tire including a recess adapted to receive said laterally extending projection for interlocking said adjacent tires, and means clamping said tires together on said hub.

STANLEY M. MERCIER.

REFERENCES CITED

The following references are of record in the file of this patent:

UNITED STATES PATENTS

| Number | Name | Date |
|---|---|---|
| 1,282,562 | Fowler | Oct. 22, 1918 |
| 1,500,579 | Eager | July 8, 1924 |
| 2,169,624 | Weiss et al. | Aug. 15, 1939 |
| 2,427,172 | Williams | Sept. 9, 1947 |
| 2,433,789 | Searles et al. | Dec. 30, 1947 |